United States Patent
Shirvanian

(10) Patent No.: US 9,147,890 B2
(45) Date of Patent: Sep. 29, 2015

(54) FUEL CELL WITH EMBEDDED FLOW FIELD

(75) Inventor: Alireza Pezhman Shirvanian, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 12/777,785

(22) Filed: May 11, 2010

(65) Prior Publication Data

US 2011/0165491 A1 Jul. 7, 2011

(51) Int. Cl.
*H01M 8/02* (2006.01)
*H01M 8/24* (2006.01)
*H01M 8/10* (2006.01)

(52) U.S. Cl.
CPC ............ *H01M 8/0258* (2013.01); *H01M 8/241* (2013.01); *H01M 2008/1095* (2013.01); *Y02E 60/50* (2013.01)

(58) Field of Classification Search
CPC .............. H01M 8/0258; H01M 8/241; H01M 2008/1095; H01M 8/0232; H01M 8/0625; H01M 8/1206
USPC .................................................. 429/457, 514
See application file for complete search history.

(56) References Cited

U.S. PATENT DOCUMENTS

| 5,641,586 | A | 6/1997 | Wilson |
| 5,752,988 | A * | 5/1998 | Okamoto et al. ............ 29/623.5 |
| 5,786,105 | A | 7/1998 | Matsushima et al. |
| 6,586,128 | B1 | 7/2003 | Johnson et al. |
| 6,783,880 | B2 | 8/2004 | Christiansen |
| 6,828,054 | B2 | 12/2004 | Appleby et al. |
| 2002/0114990 | A1 * | 8/2002 | Fly et al. .......................... 429/44 |
| 2005/0221153 | A1 * | 10/2005 | Sugimoto et al. ............... 429/38 |
| 2009/0023046 | A1 * | 1/2009 | Wang et al. ...................... 429/35 |
| 2009/0035631 | A1 * | 2/2009 | Zagaja et al. .................... 429/25 |

FOREIGN PATENT DOCUMENTS

| JP | 3055764 A | 3/1991 |
| JP | 6338336 A | 12/1994 |
| JP | 8037011 A | 2/1996 |

OTHER PUBLICATIONS

E. Carcadea, et al., A Computational Fluid Dynamics Analysis of a PEM Fuel Cell System for Power Generation, International Journal of Numerical Methods for Heat & Fluid Flow, vol. 17 No. 3, 2007.
Fuel Cell with Interdigitated Porous Flow-Fields, Los Alamos National Security, LLC for the U.S. Department of Energy's NNSA Inside, Copyright 2008-09 Los Alamos National Security, LLC.
Weber, Adam Z. et al, Understanding Porous Water-Transport Places in Polymer-electolyte Fuel Cells, Journal of power sources, ISSN 0378-7753, CODEN JPSODZ, 2007, NOL. 168, N. 1.

* cited by examiner

*Primary Examiner* — Muhammad Siddiquee
(74) *Attorney, Agent, or Firm* — Damian Porcari; Brooks Bushman P.C.

(57) ABSTRACT

A fuel cell may include a porous plate having an embedded flow field formed therein, a catalyst supported on and within the porous plate, and a proton exchange membrane in contact with the porous plate and catalyst. Such fuel cells may be arranged to form a fuel cell stack configured to provide power to move a vehicle.

11 Claims, 3 Drawing Sheets

FUEL CELL WITH EMBEDDED FLOW FIELD

BACKGROUND

Fuel cell systems are increasingly being used as power sources in a wide variety of applications. Fuel cell systems, for example, may be used to power automotive vehicles.

A proton exchange membrane (PEM) fuel cell includes a membrane electrode assembly (MEA) that is sandwiched between conductive anode and cathode plates. To produce electricity through an electrochemical reaction, hydrogen ($H_2$) is supplied to the anode and oxygen ($O_2$) is supplied to the cathode (via air). In a first half-cell reaction, dissociation of the hydrogen $H_2$ at the anode generates hydrogen protons $H^+$ and electrons $e^-$. The membrane is proton conductive and dielectric. As a result, the protons are transported through the membrane while the electrons flow through an external electrical load that is connected across the membrane. In a second half-cell reaction, oxygen $O_2$ at the cathode reacts with protons $H^+$, and electrons $e^-$ are taken up to form water $H_2O$.

SUMMARY

A fuel cell, in certain embodiments, may include a plate having an embedded flow field formed therein. The flow field may be configured to distribute gas throughout the plate. The fuel cell may also include a gas diffusion layer in contact with the plate and a catalyst layer in contact with the gas diffusion layer. The plate may be configured to permit the gas to at least one of convect and diffuse from the flow field, through the plate and to the gas diffusion layer.

A fuel cell, in other embodiments, may include a porous plate having an embedded flow field formed therein, a catalyst supported on and within the porous plate, and a proton exchange membrane in contact with the porous plate and catalyst.

In still other embodiments, an automotive vehicle may include a fuel cell stack configured to provide power to move the vehicle. The fuel cell stack may include a plurality of fuel cells. Each of the fuel cells may include a porous plate with an embedded flow field formed therein, a catalyst supported on and within the porous plate, and a proton exchange membrane in contact with the porous plate and catalyst

BRIEF DESCRIPTION OF THE DRAWINGS

Like numerals of the Figure may share similar, although not necessarily identical, descriptions. As an example, numbered elements 22, 122, etc. may share similar descriptions.

DETAILED DESCRIPTION

In a PEM fuel cell, anode and cathode gas diffusion layers (GDLs) allow the respective reactants, hydrogen and oxygen, to reach the reactive zone within the electrode. Electrons and heat are conducted through each GDL, which form a link between the reactive zone (catalyst layer), cooling plates, and current collector plates. The GDL at the cathode may also facilitate the removal of product water (usually liquid).

Electron conduction and heat recovery from the MEA in fuel cells equipped with conventional flow fields typically occur at the land/current collector areas, where the GDL and flow field are in direct contact. While reactive areas under the land are in direct contact with the land/current collectors, reactive areas under the flow channels rely heavily on the GDL to conduct the generated electricity and heat to/from the land/current collectors. This additional electrical and heat conduction through those portions of the GDL under the flow channels is not efficient relative to the electrical and heat conduction through those portions of the GDL in direct contact with the land/current collectors. Ohmic and thermal losses thus occur.

Reactive areas under the land/current collectors may experience reactant transport limitations. These areas rely on the GDL's in-plane or transverse transport of reactants, often leading to non-uniform distribution of reactants under the land/current collectors.

Figure 1:
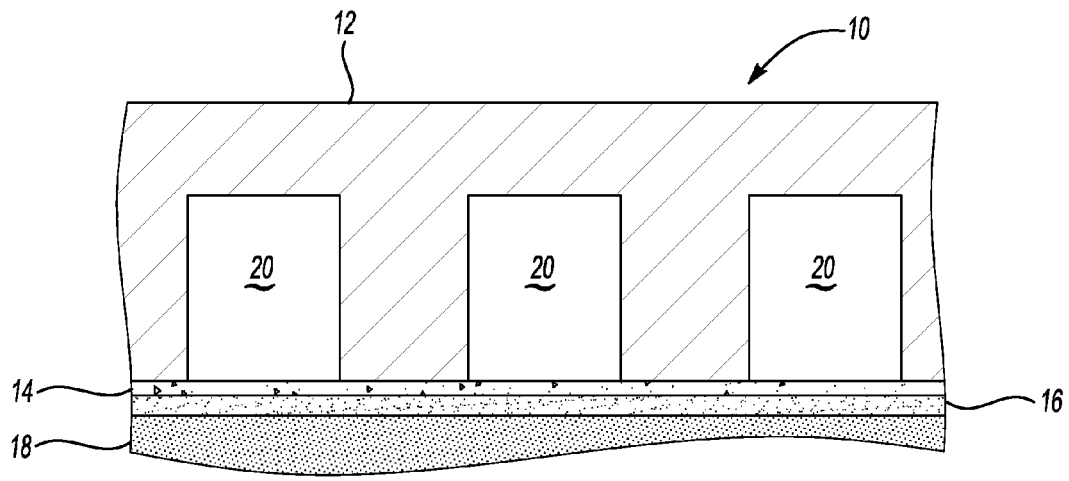
FIG. 1 is an end view, in cross-section, of a portion of a conventional fuel cell.

Referring to FIG. 1, a conventional fuel cell 10 includes a non-porous plate 12, a GDL 14 in contact with the plate 12, a catalyst layer 16 in contact with the GDL 14 (together forming an anode), and a proton exchange membrane 18 in contact with the catalyst layer 16.

Channels 20 formed in the plate 12 are configured to direct gas, such as hydrogen, to the GDL 14. The gas diffuses through the GDL to the catalyst layer 16. The catalyst layer 16 promotes separation of the hydrogen into protons and electrons. The protons migrate through the membrane 18. The electrons travel through an external circuit (not shown).

Oxygen may flow to a cathode portion (not shown) of the fuel cell 10. The protons that migrate through the membrane 18 combine with the oxygen and electrons returning from the external circuit to form water and heat.

Tenting or migration of the GDL 14 into the channels 20 may occur due to transverse compression of land areas on the GDL 14 and/or distortion of the MEA due to water uptake. Tenting may result in delamination of the MEA, which may be detrimental to the MEA's efficiency and durability.

Certain embodiments disclosed herein provide a PEM fuel cell having flow channels (serpentine, interdigitated, non-interdigitated, fractal, straight-flow, etc.) embedded in a porous plate with a GDL supported thereon. These flow fields may be completely enclosed within the plate (unlike those of FIG. 1), which may help to prevent the ohmic and thermal losses as well as the tenting described above. The flow channels may also be located arbitrarily close to the gas diffusion layer to promote communication with the gas diffusion layer.

Other embodiments disclosed herein provide a flow field formed in a porous bulk with a catalyst and ionomer supported therein. This bulk-supported catalyst may lead to smaller requisite cell and stack areas. Additional arrangements and scenarios, as described below, are also possible.

Fuel cells incorporating porous plates as described above may exhibit less sensitivity to endplate, transitioning region, and/or manifold design. While conventional flow fields often require a precise design for dividing the streams of reactants between individual channels, porous plates, by virtue of their porosity, may balance out pressure/flow gradients existing between channels.

Figure 2:
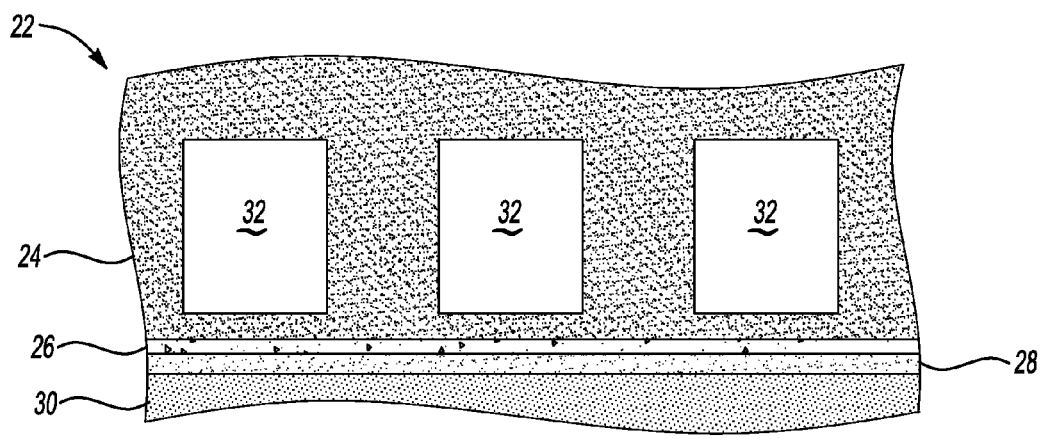
FIG. 2 is an end view, in cross-section, of a portion of an embodiment of a fuel cell.

Referring to FIG. 2, another fuel cell 22 includes a porous plate (or bulk) 24 (graphite, porous carbon, porous metal, etc.), a GDL 26 in contact with the plate 24, a catalyst layer 28 in contact with the GDL 26 (together forming an anode), and a proton exchange membrane 30 in contact with the catalyst layer 28.

Channels 32 formed (embedded) within the plate 24 are configured to direct gas, such as hydrogen or air, through the plate 24. The channels 32, in this embodiment, are rectangular in cross-section and form a serpentine passageway through the plate 24. The channels 32, however, may take any suitable shape and form any suitable passageway through the plate 40.

The porosity of the plate 24 is such that gas in the channels 32 convects and/or diffuses through the plate 24 to the GDL 26, and also between the channels 32. (As known in the art, pressure gradients drive convection whereas concentration gradients drive diffusion.) The porosity of the plate 24 may range from 0.01 to 0.99 and need not be uniform. For example, the porosity of the plate 24 near the land (the surface of the plate 24 in contact with the GDL 26) may be less than elsewhere. The tortuosity of the plate 24 may be at least 1. Optimum plate porosity (distribution) and tortuosity for a given fuel cell design may be determined based on testing, simulation, etc.

Because the plate 24 distributes reactants to the GDL 26, channels having relatively large dimensions are not necessary. As a result, smaller channels and larger land/current collector areas may be achieved. For example, landing areas may be increased by a factor of 2 (or larger) in some configurations. Additionally, these smaller channels may remain free from flooding as the porous plate 24 may absorb any water droplets that form.

Figure 3:
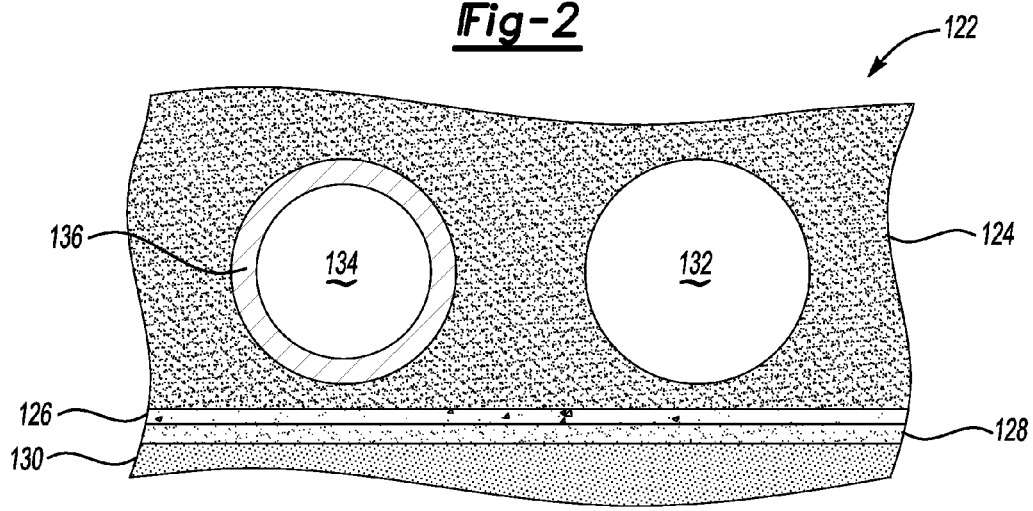
FIG. 3 is an end view, in cross-section, of a portion of another embodiment of a fuel cell.

Referring to FIG. 3, yet another fuel cell 122 includes coolant channels 134 formed within the plate 124. The channels 134 are configured to direct coolant, such as water, through the plate 124. Pipes 136 disposed within the channels 134 prevent coolant from convecting and/or diffusing through the plate 124.

A given porous plate may have the capacity to upload more catalyst than possible with conventional MEAS. The plate, therefore, may be partially or entirely submerged in a container of catalyst ink (or the like). Due to the wicking or capillary attraction within the porous plate, the catalyst ink is drawn into the bulk in addition to being spread on the surface of the plate. Alternatively, catalyst may, for example, be deposited on and/or within the plate via wet chemical/electrodeposition, chemical and physical vapor deposition (CVD, PVD), or atomic layer deposition (ALD).

Catalyst ink of high Nafion content, for example, may facilitate proton conductivity to the bulk of the plate. The catalyst ink may include hydrophobic additives (e.g., Teflon) or hydrophilic additives (e.g., carbon) that may further enhance the water management capabilities of the plate when supported thereon. The catalyst ink may include additives such as porous carbon meso/nano particles that further assist with reactant distribution within the bulk of the porous plate as well as provide electrical conductivity to the bulk of the plate when supported thereon.

In certain embodiments, the porous plate may be dosed with additives such as metal oxides (e.g., titanium oxide, molybdenum manganese oxide, niobium oxide), conductive polymers (e.g., polyanilin, polypyrrole, polythiophen), etc. that promote catalytic activity and favorable crystal growth of catalyst during deposition.

Figure 4:
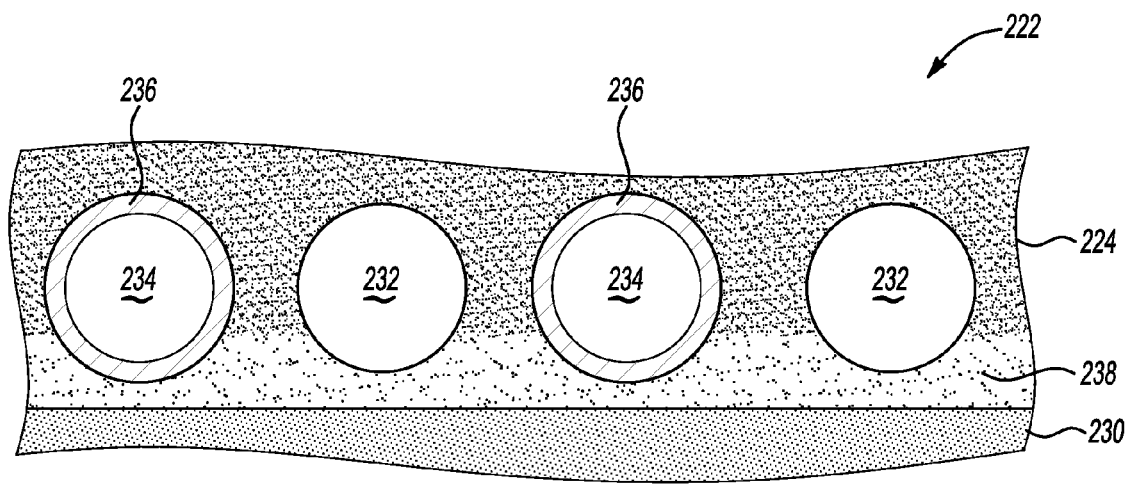
FIG. 4 is an end view, in cross-section, of a portion of yet another embodiment of a fuel cell.

Referring to FIG. 4, still yet another fuel cell 222 has catalyst and ionomer 238 supported on and within the bulk of the porous plate 224 after having been partially submerged in a catalyst ink (or the like) as described above. The fuel cell 222 thus lacks a GDL and separate catalyst layer. As a result, the proton exchange membrane 230 is in contact with the catalyst and ionomer 238 and porous plate 224.

Experimentally, a porous plate similar to that illustrated in FIG. 4 was weighed before and after being submerged in a catalyst ink container. (The porous plate was left to dry for 24 hours after being submerged). The weight of the plate before and after application of the catalyst ink was 25.04591 g and 25.351529 g, respectively. Based on the weight difference of 0.30561 g and the composition of the catalyst ink, a loading of $3.395 \times 10^{-2}$ grams of platinum in the bulk was obtained (or 1.358 mg/cm$^2$ when normalized using the plate's active area of 5 cm$^2$). Of course, higher loadings could also be obtained using the same method.

Figure 5:
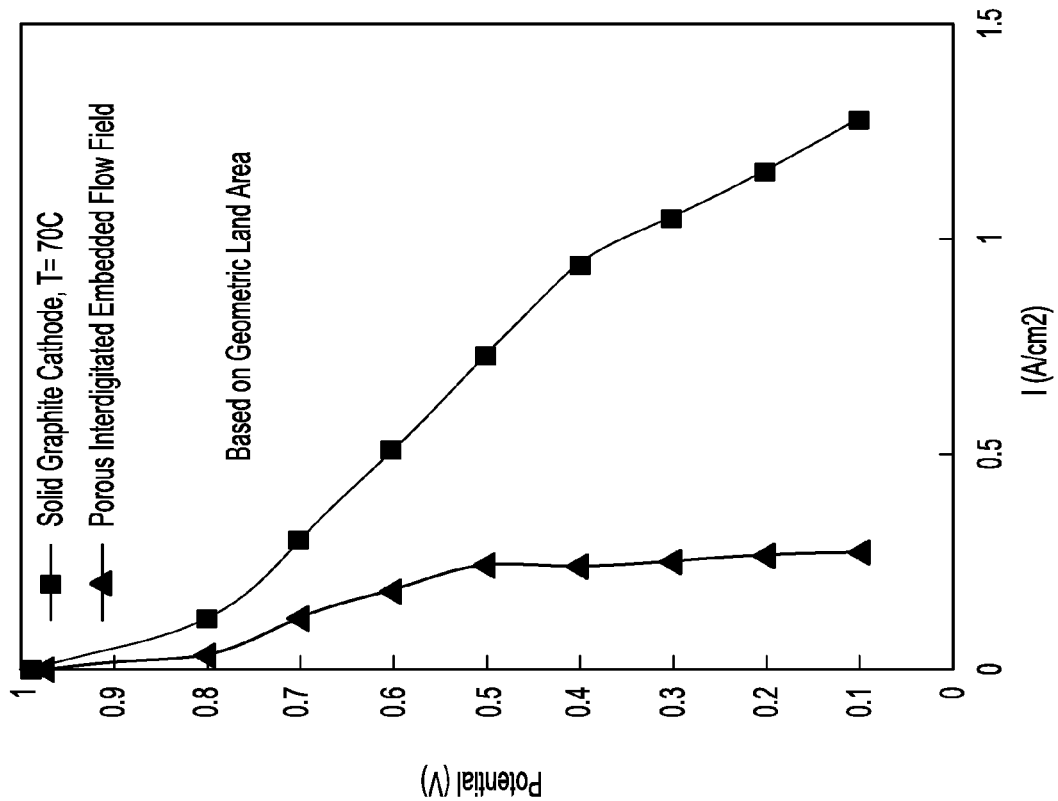
FIG. 5 illustrates example cathode polarization curves based on geometric land area.

Referring to FIG. 5, example polarization curves based on geometric land area are plotted for (i) a fuel cell having a cathode-side porous graphite plate with an interdigitated embedded flow field and lacking a gas diffusion layer (similar to FIG. 4) and (ii) a fuel cell having a cathode-side non-porous plate with a serpentine non-embedded flow field and including a gas diffusion layer (similar to FIG. 1).

Figure 6:
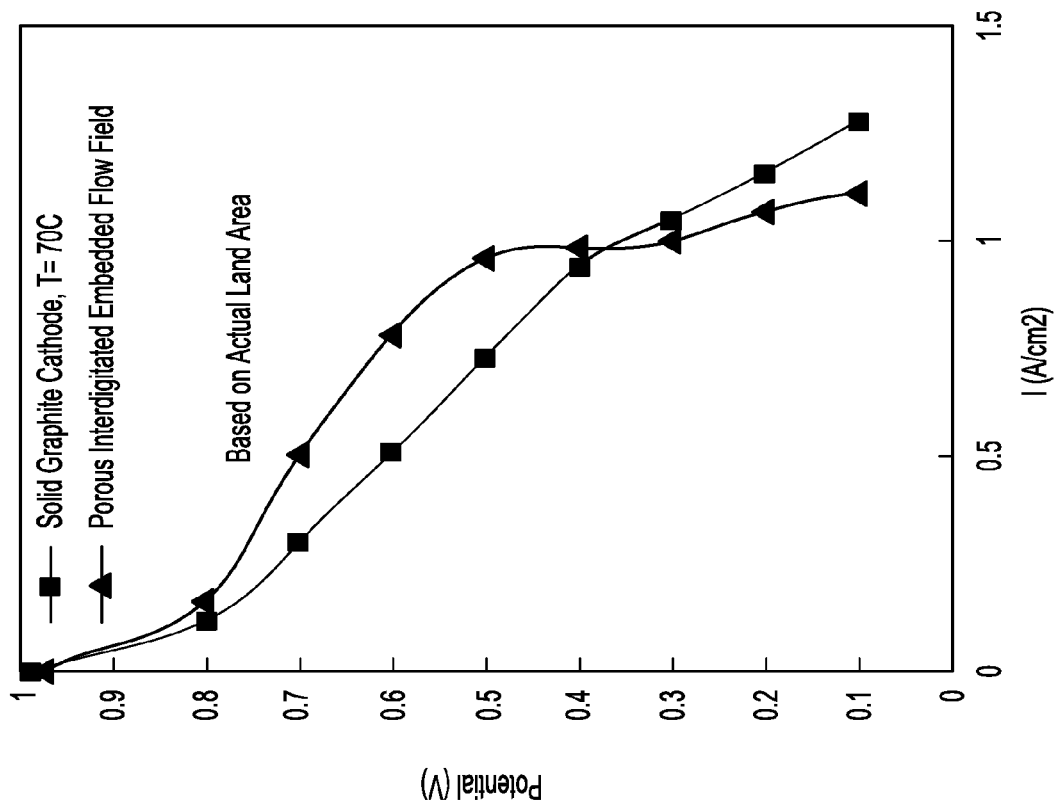
FIG. 6 illustrates example cathode polarization curves based on actual land area.

Referring to FIG. 6, example polarization curves based on actual land area are plotted for the fuel cells of FIG. 5. The fuel cell with the cathode-side porous plate lacking a gas diffusion layer generally demonstrates improved performance compared with the conventional fuel cell. The fuel cell with the cathode-side porous plate, however, may have experienced mass transfer limitations because the periphery of the porous plate, in this experiment, was not sealed. Gasses could thus escape. Even better performance would be expected in circumstances where the periphery is sealed.

Supporting catalyst in the bulk of a porous plate may enable smaller and more compact fuel cell designs. A conventional catalyst layer, for example, varies from 10 to 20 microns in thickness. A thicker catalyst layer (to increase loading) would potentially decrease requisite cell geometric surface area as well as exacerbate issues with water management and catalyst layer reactant distribution. In contrast, porous plates similar to those illustrated in FIG. 4 may facilitate water management/reactant distribution as well as support the catalyst, thereby reducing requisite cell size and eliminating the need for a catalyst layer.

The thickest operational membrane, Nafion 117, has a thickness of 7 mil (177.8 microns). A conservative estimate for maximum path efficiency for proton conductivity is equivalent to the Nafion 117 thickness, i.e., about 7 mil. If one were to use a Nafion 212 (2 mil thickness) membrane for a porous plate cell, one could assume with confidence that a catalyst ink with a rich mixture of ionomer (e.g., Nafion) would conduct protons to a depth of at least 7−2=5 mil (127 microns) into the bulk of the porous plate. Hence, the requisite surface area could be reduced by a factor of 6.35 to 12.7 times (127/20=6.35, 127/10=12.7) depending on catalyst thickness.

Figure 7:
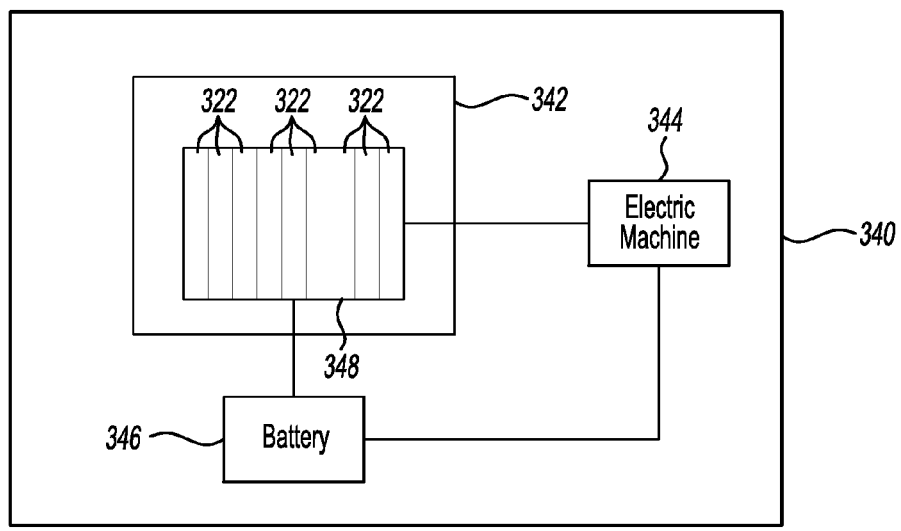
FIG. 7 is an embodiment of an automotive vehicle.

Referring to FIG. 7, an automotive vehicle 340 may include a fuel cell system 342 arranged in a known fashion to provide electrical power to an electric machine 344 or battery 346. As apparent to those of ordinary skill, the electric machine 344 may convert the electrical power to motive power to move the vehicle 340. The battery 346 may store the electrical power for later use by the electric machine 344.

The fuel cell system 342 includes a fuel cell stack 348. The fuel cell stack 348 may include a plurality of fuel cells 322 similar to those described with reference to FIGS. 2, 3 and/or 4.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A fuel cell comprising:
a porous plate having an embedded flow field formed therein;
a catalyst ink, including an ionomer and hydrophobic additives, supported on and within the porous plate; and
a proton exchange membrane in contact with the porous plate and catalyst, wherein a porosity of the porous plate in a vicinity of the proton exchange membrane is less than a porosity of the porous plate away from the proton exchange membrane.

2. The fuel cell of claim 1 further comprising a porous carbon supported on and within the porous plate.

3. The fuel cell of claim 1 further comprising at least one of a metal oxide and conductive polymer supported on and within the porous plate.

4. The fuel cell of claim 1 wherein the porous plate is comprised of at least one of graphite and porous metal.

5. The fuel cell of claim 1 wherein the porous plate has a porosity in a range of 0.01 to 0.99.

6. A system comprising:
an automotive vehicle including a fuel cell stack configured to provide power to move the vehicle, the fuel cell stack including a plurality of fuel cells each having (i) a porous plate with an embedded flow field formed therein, (ii) a catalyst ink, including an ionomer and hydrophobic additives, supported on and within the porous plate and (iii) a proton exchange membrane in contact with the porous plate and catalyst, wherein a porosity of the porous plate in a vicinity of the proton exchange membrane is less than a porosity of the porous plate away from the proton exchange membrane.

7. The system of claim 6 wherein each of the porous plates further has a porous carbon supported on and within the porous plate.

8. The system of claim 6 wherein each of the porous plates further has at least one of a metal oxide and conductive polymer supported on and within the porous plate.

9. The system of claim 6 wherein each of the porous plates is comprised of at least one of graphite and porous metal.

10. The system of claim 6 wherein each of the porous plates has a porosity in a range of 0.01 to 0.99.

11. The system of claim 6 wherein at least one of the porous plates has a non-uniform porosity.

* * * * *